United States Patent
Nicholson et al.

(10) Patent No.: US 7,594,379 B2
(45) Date of Patent: Sep. 29, 2009

(54) MOWER CUTTING DECK HAVING OPERATOR CONTROLLED DISCHARGE OPENING USING FOOT PEDAL CONTROL

(75) Inventors: Gary L. Nicholson, Beatrice, NE (US); Michael E. Allen, Lincoln, NE (US)

(73) Assignee: Exmark Mfg. Co., Inc., Beatrice, NE (US)

( * ) Notice: Subject to any disclaimer, the term of this patent is extended or adjusted under 35 U.S.C. 154(b) by 0 days.

(21) Appl. No.: 11/888,895

(22) Filed: Aug. 2, 2007

(65) Prior Publication Data
US 2009/0031689 A1 Feb. 5, 2009

(51) Int. Cl.
*A01D 67/00* (2006.01)
(52) U.S. Cl. .................................... 56/320.2
(58) Field of Classification Search ............... 56/320.2, 56/320.1, 16.6, 17.3, 17.4
See application file for complete search history.

(56) References Cited

U.S. PATENT DOCUMENTS

| | | | |
|---|---|---|---|
| 3,404,519 A | 10/1968 | Demers | |
| 3,636,686 A * | 1/1972 | Meyer et al. | 56/320.2 |
| 3,721,078 A | 3/1973 | Haffner | |
| 3,893,284 A | 7/1975 | Thon et al. | |
| 4,008,559 A * | 2/1977 | Lessig et al. | 56/320.2 |
| 4,043,102 A * | 8/1977 | Uhlinger et al. | 56/17.4 |
| 4,226,074 A | 10/1980 | Mullet et al. | |
| 4,726,177 A * | 2/1988 | McGoughy | 56/202 |
| 4,800,712 A * | 1/1989 | Morse et al. | 56/202 |
| 5,133,175 A | 7/1992 | Dumbrell | |
| 5,355,666 A * | 10/1994 | McDonner et al. | 56/255 |
| 5,442,902 A * | 8/1995 | Mosley et al. | 56/17.5 |
| 5,826,417 A | 10/1998 | Evans | |
| 6,490,851 B2 * | 12/2002 | Kutsukake | 56/320.1 |
| 6,609,358 B1 * | 8/2003 | Schmidt et al. | 56/320.2 |
| 6,694,716 B1 * | 2/2004 | Osborne | 56/202 |
| 6,854,253 B2 * | 2/2005 | Dickey | 56/320.2 |
| 6,857,256 B2 * | 2/2005 | Strange et al. | 56/320.2 |
| 6,874,309 B1 | 4/2005 | Bellis, Jr. | |
| 6,910,324 B2 | 6/2005 | Kakuk | |

(Continued)

OTHER PUBLICATIONS

The Director brochure from yorksheet.com website dated Mar. 30, 2005, partial open position shown p. 2.

(Continued)

*Primary Examiner*—Árpád Fábián-Kovács
(74) *Attorney, Agent, or Firm*—James W. Miller (57) ABSTRACT

A mower has a rotary cutting deck with a discharge opening covered by a discharge chute. A pivotal gate is placed beneath the discharge chute to pivot relative to the discharge opening between a closed position in which the gate blocks the discharge opening and an open position in which the gate opens the discharge opening, thereby providing discharge and non-discharge modes of operation respectively. A pivotal foot pedal can be depressed by the operator against the force of a biasing spring to move the gate between the closed and open positions thereof. When the gate reaches its open position corresponding to a fully depressed foot pedal, an over center linkage has reached an over center orientation in which the force of the spring now serves to lock the pivotal gate in the open position thereof. Another over center linkage also locks the pivotal gate in the closed position thereof when the foot pedal is in a non-depressed starting position.

13 Claims, 8 Drawing Sheets

U.S. PATENT DOCUMENTS

| | | | |
|---|---|---|---|
| 6,966,169 B2 * | 11/2005 | Osborne | 56/202 |
| 6,971,224 B1 * | 12/2005 | Hancock | 56/320.2 |
| 7,204,073 B1 * | 4/2007 | Chenevert | 56/320.2 |
| 7,337,602 B1 * | 3/2008 | Butler et al. | 56/320.2 |
| 7,406,817 B2 * | 8/2008 | Bledsoe | 56/320.2 |
| 7,448,195 B2 * | 11/2008 | Kohler | 56/320.2 |
| 2004/0083702 A1 * | 5/2004 | Strange et al. | 56/320.2 |
| 2004/0112031 A1 * | 6/2004 | Dickey | 56/320.2 |
| 2008/0000211 A1 * | 1/2008 | Hafendorfer et al. | 56/320.2 |
| 2008/0092509 A1 * | 4/2008 | Imanishi et al. | 56/320.2 |
| 2008/0250768 A1 * | 10/2008 | Butler et al. | 56/320.2 |

OTHER PUBLICATIONS

The Grass Handler brochure from wechapps.com website dated Mar. 30, 2005, first and second paragraphs.

The Qwickchute Advantage brochure from quickchute.com website dated Mar. 30, 3005, partial open position.

The Trimmer Trap brochure from trimmertrap.com website dated May 1, 2006.

The EZchute brochure from exchute.com website dated May 16, 2006.

The Model DS100 materials dated May 27, 2004 and Apr. 20, 2006.

* cited by examiner

MOWER CUTTING DECK HAVING OPERATOR CONTROLLED DISCHARGE OPENING USING FOOT PEDAL CONTROL

TECHNICAL FIELD

This invention relates to a rotary mower cutting deck having a discharge opening through which grass clippings may be discharged from the deck.

BACKGROUND OF THE INVENTION

Lawn mowers are known having rotary cutting decks attached to or carried by the frame of the mower. Rotary cutting decks carry one or more cutting blades that rotate in substantially horizontal cutting planes. The decks are called rotary decks because of the rotary nature of the blade(s). The grass clippings created by the rotating action of the blade(s) are usually discharged through a discharge opening, often located on the right side of the deck. A discharge chute often extends outwardly from the side of the deck to shield the discharge opening to prevent bystanders from being struck by thrown objects.

Multi-bladed rotary cutting decks of this type are often carried on riding lawn mowers that are operated by an operator who is seated on a seat on the frame of the mower. In addition, rotary cutting decks of this type are also often convertible between a discharge mode of operation, in which the discharge opening is open, and a non-discharge mode of operation, in which the discharge opening is blocked. When the discharge opening is blocked, the grass clippings cannot escape through the discharge opening.

The reason for having a non-discharge mode of operation is to save time when cutting around areas in which the discharge of grass clippings would not be desirable. For example, if the operator is mowing or trimming around flower beds, sidewalks, driveways, or the like, the operator normally wants to prevent grass clippings from being discharged into the flower beds or onto the sidewalks and driveways. In a mower with a continuously open discharge opening oriented on the right side of the mower deck, this meant that the operator always had to place the left or non-discharge side of the cutting deck adjacent the flower beds, sidewalks, driveways, etc. when passing past such areas. Thus, the operator would frequently have to change directions while mowing to get the left side of the cutting deck up against the areas where the clippings should not be discharged. This need to change direction takes extra time and can be annoying to the operator.

Some riding mowers have a blocking member adjacent the discharge opening that comprises a pivotal flap or gate. The gate has a closed position in which the gate covers the discharge opening in the non-discharge mode. The gate also has an open position in which the gate is clear of the discharge opening in the discharge mode.

Thus, when the operator is mowing, if the operator comes to an area where grass clippings should not be discharged and the discharge opening is adjacent such areas, the operator can simply temporarily pivot the gate into its closed position to block the discharge opening. In this position, the grass clippings simply hit the closed gate and fall down to the ground without being discharged outside the deck. When the mower clears this area, the operator can pivot the gate back to its open position to resume discharging grass clippings from the deck. Moving the gate between its open and closed positions can be done quickly and on a temporary basis to block the grass clippings for even very short periods of time without having to change the direction of motion of the mower.

The gate in such mowers is connected by a linkage to an operating handle placed near the operator's seat. The operator can swing the gate between its open and closed positions simply by moving the operating handle from one handle position to another. This can be done without stopping the mower and without the operator dismounting the mower. U.S. Pat. No. 6,874,309 to Bellis, Jr. discloses a handle operated, pivotal gate of this type.

There are disadvantages with hand operated gates of this type. For example, the need to switch modes often occurs when the operator is maneuvering the mower around flower beds or other areas of the like with convoluted, curved borders or side edges. During such maneuvering, the operator would normally prefer to keep both hands on the steering wheel or the steering levers of the mower. But, in order to switch modes of operation, the operator often has to use one hand to move the operating handle to pivot the gate from its open to closed position or vise versa. If the operator wants to switch modes frequently while maneuvering the mower in this manner, the operator has to frequently take one hand off the steering controls in order to do this. This is not desirable.

In addition, in known mowers, the pivotal gate is arranged to be in either an open or closed position. In other words, the handle is moved between two bistable positions in which the handle is locked. In one position of the handle, the gate is held in its open position. In the other position of the handle, the gate is held in its closed position. There is no provision for holding the gate in intermediate position(s) that are partly open/partly closed. This would be a desirable attribute since it would give the operator some means of feathering between the modes of operation if the operator wanted the discharge opening to be partially open and partially blocked at the same time.

SUMMARY OF THE INVENTION

One aspect of this invention relates to a mower cutting deck having a discharge opening for discharging grass clippings from the cutting deck. This aspect of the invention comprises a movable gate having a closed position in which the gate substantially blocks the discharge opening to place the cutting deck in a non-discharge mode of operation and an open position in which the gate substantially clears the discharge opening to place the cutting deck in a discharge mode of operation. A pivotal foot pedal is operatively coupled to the gate for allowing an operator to control the position of the gate by depressing the foot pedal. The foot pedal can be selectively depressed by the operator between a non-depressed starting position and a fully depressed ending position. A spring applies a spring force to the foot pedal tending to cause the foot pedal to rise to its non-depressed starting position such that the operator has to apply down pressure to the foot pedal to move the foot pedal against the spring force, whereby the spring force opposes movement of the foot pedal at least over a first range of travel of the foot pedal such that the operator can feather the position of the foot pedal by increasing or decreasing the down pressure on the foot pedal to hold the gate in intermediate positions between the open and closed positions of the gate.

Another aspect of this invention relates to a mower cutting deck having a discharge opening for discharging grass clippings from the cutting deck. This aspect of the invention comprises a pivotal gate adjacent the discharge opening. The gate has an open position and a closed position for opening and closing the discharge opening, respectively. A pivotal control is provided for selective actuation by an operator. A gate pivot linkage pivots the gate in response to movement of the pivotal control. At least one over center linkage moves into an over center orientation to retain the gate in at least one of the open and closed positions thereof.

Yet another aspect of this invention relates to a mower having a rotary cutting deck with a discharge opening, which comprises pivotal gate that pivots relative to the discharge opening between a closed position in which the gate blocks the discharge opening and an open position in which the gate opens the discharge opening, thereby providing discharge and non-discharge modes of operation respectively. A pivotal foot pedal can be depressed by the operator against the force of a biasing spring to move the gate between the closed and open positions thereof. An over center linkage reaches an over center orientation to lock the pivotal gate in the open position thereof without requiring constant down pressure on the foot pedal.

BRIEF DESCRIPTION OF THE DRAWINGS

This invention will be described hereafter in the Detailed Description, taken in conjunction with the following drawings, in which like reference numerals refer to like elements or parts throughout.

DETAILED DESCRIPTION

Figure 1:
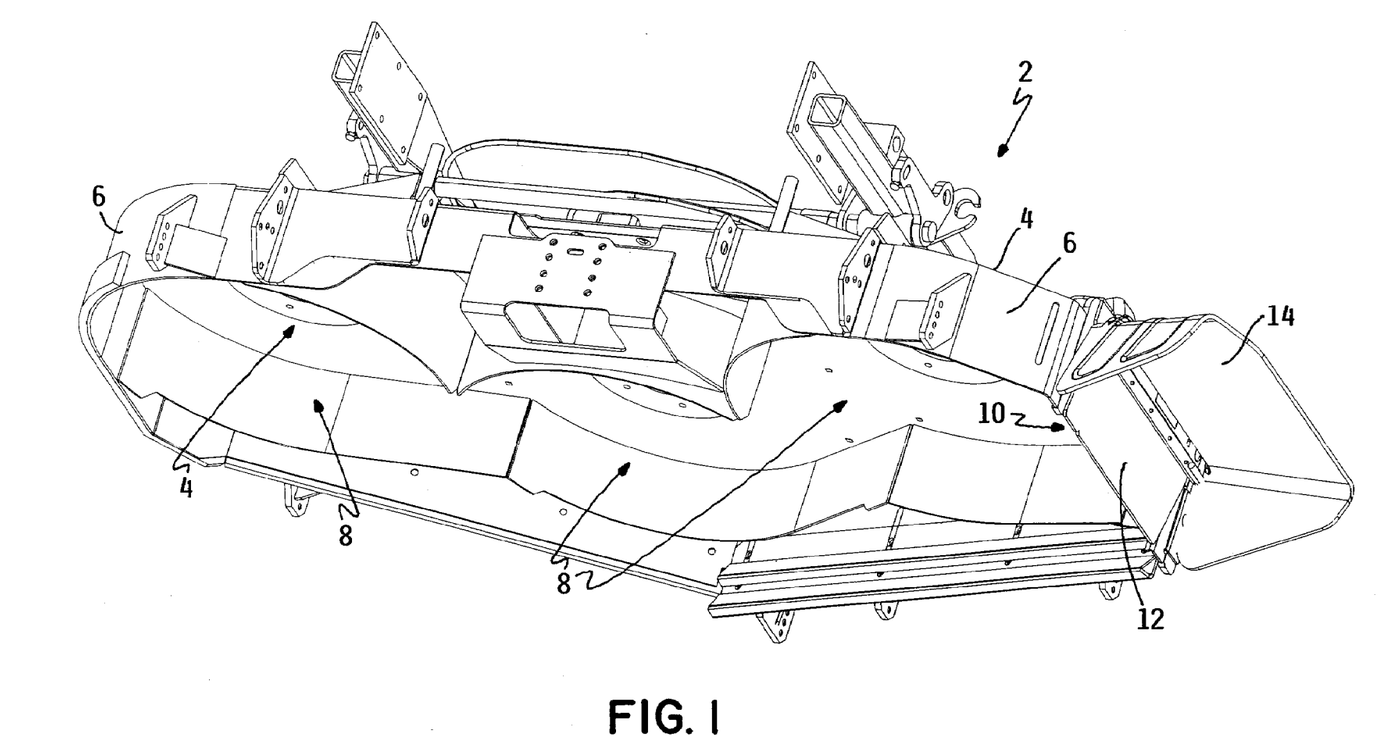
FIG. 1 is a perspective view of a rotary cutting deck according to this invention, particularly illustrating the pivotal gate located beneath the discharge chute of the mower with the pivotal gate being in its closed position to block the discharge opening of the deck.

FIG. 1 shows a rotary cutting deck 2 of the type that is attached to or carried by the frame of a lawn mower (not shown). Cutting deck 2 has a top wall 4, a peripheral wall 6 that extends downwardly from top wall 4 and forms the peripheral boundary of cutting deck 2, and three cutting chambers 8 beneath top wall 4. Each cutting chamber 8 houses a rotary cutting blade (not shown) that rotates in a substantially horizontal cutting plane about a substantially vertical axis. As the cutting blades rotate, grass clippings are generated by the impact of the cutting edges of the blades with standing stalks of grass.

Referring to FIG. 1, cutting chambers 8 are open to one another so that the grass clippings created by the cutting blades can flow between cutting chambers 8 towards a common discharge opening 10. Discharge opening 10 is provided somewhere in the peripheral boundary of cutting deck 2 and usually on one side of cutting deck 2. In FIG. 1, discharge opening 10 is shown blocked by a pivotal gate 12 that forms part of one embodiment of the present invention. FIG. 1 shows gate 12 in a closed position substantially overlying discharge opening 10.

As is customary in mowers of this type, discharge opening 10 is also covered by a generally U-shaped, downwardly facing, discharge chute 14 that extends outwardly from peripheral wall 6 for a short distance. Discharge chute 14 serves to protect bystanders from any objects that might be entrained in the grass clippings and be thrown through discharge opening 10. Discharge chute 14 will deflect such objects downwardly towards the ground and will prevent bystanders from inadvertently sticking their feet into discharge opening 10. Gate 12 is positioned beneath discharge chute 14 as shown in FIG. 1.

Figure 2:
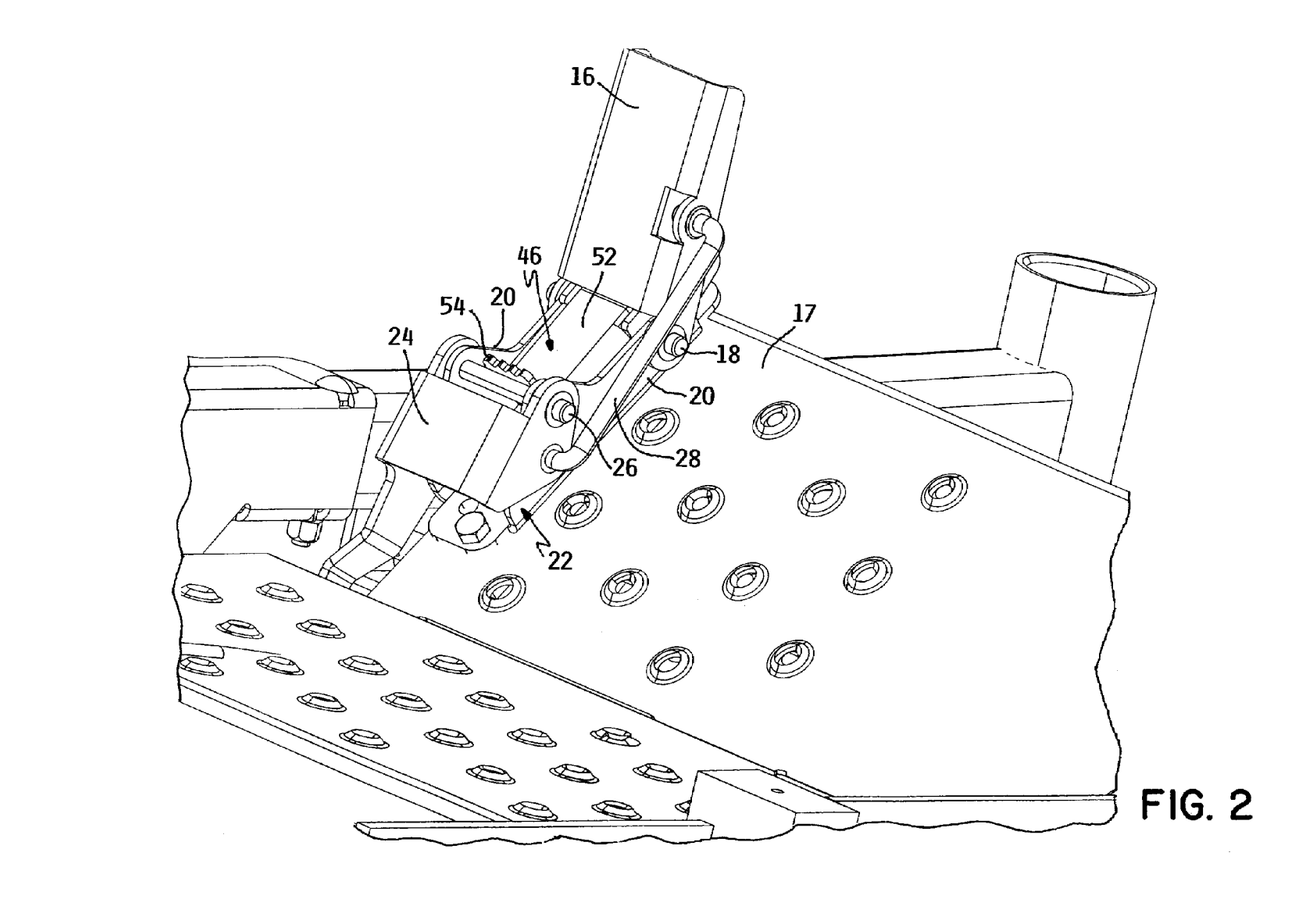
FIG. 2 is a perspective view of the foot pedal control that operates the pivotal gate of the cutting deck of FIG. 1, particularly illustrating the foot pedal control on the floorboard of the operator's station of the mower.
Figure 3:
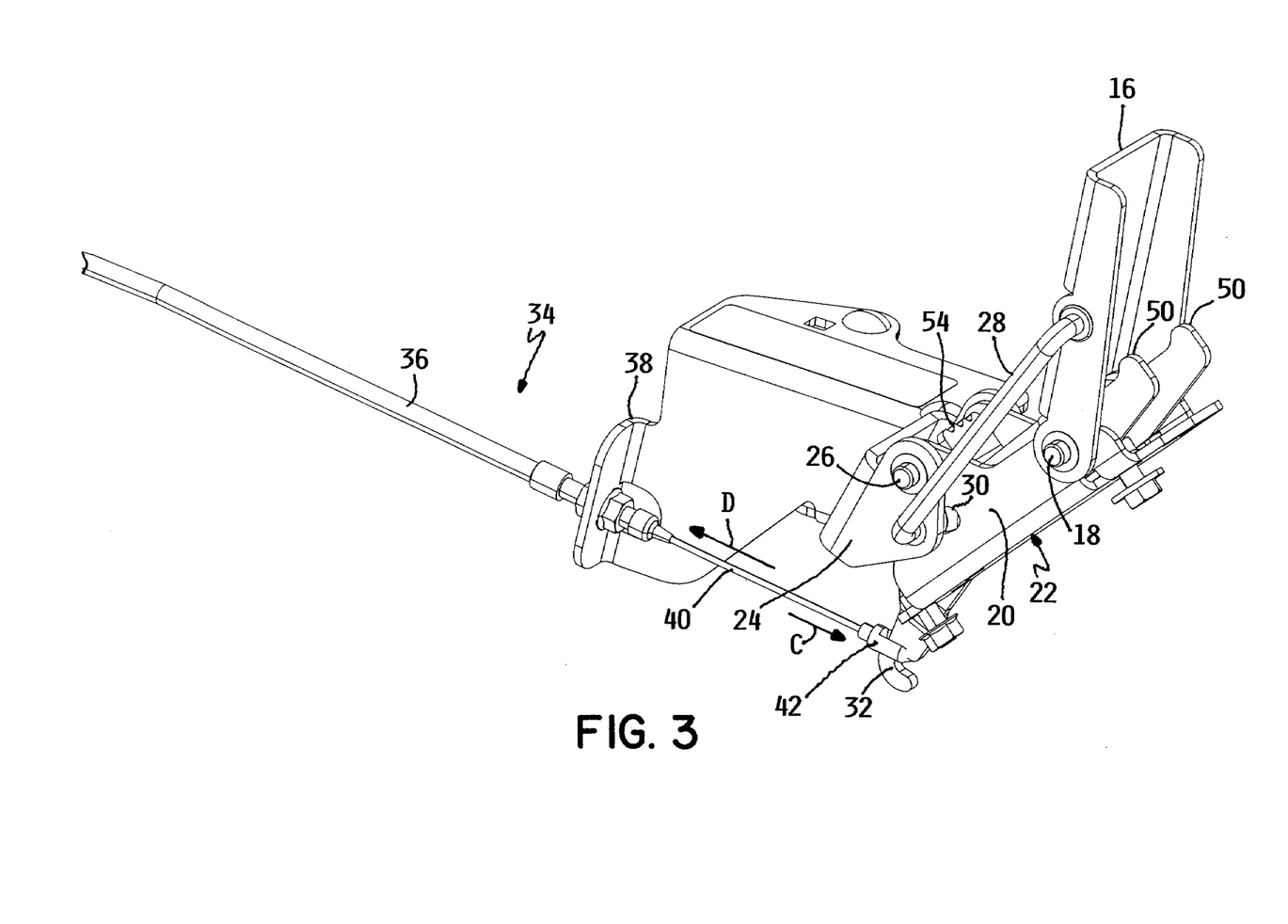
FIG. 3 is another perspective view of the foot pedal control of FIG. 2, particularly illustrating the foot pedal control, its mounting bracket, and an actuating cable connected thereto.
Figure 4:
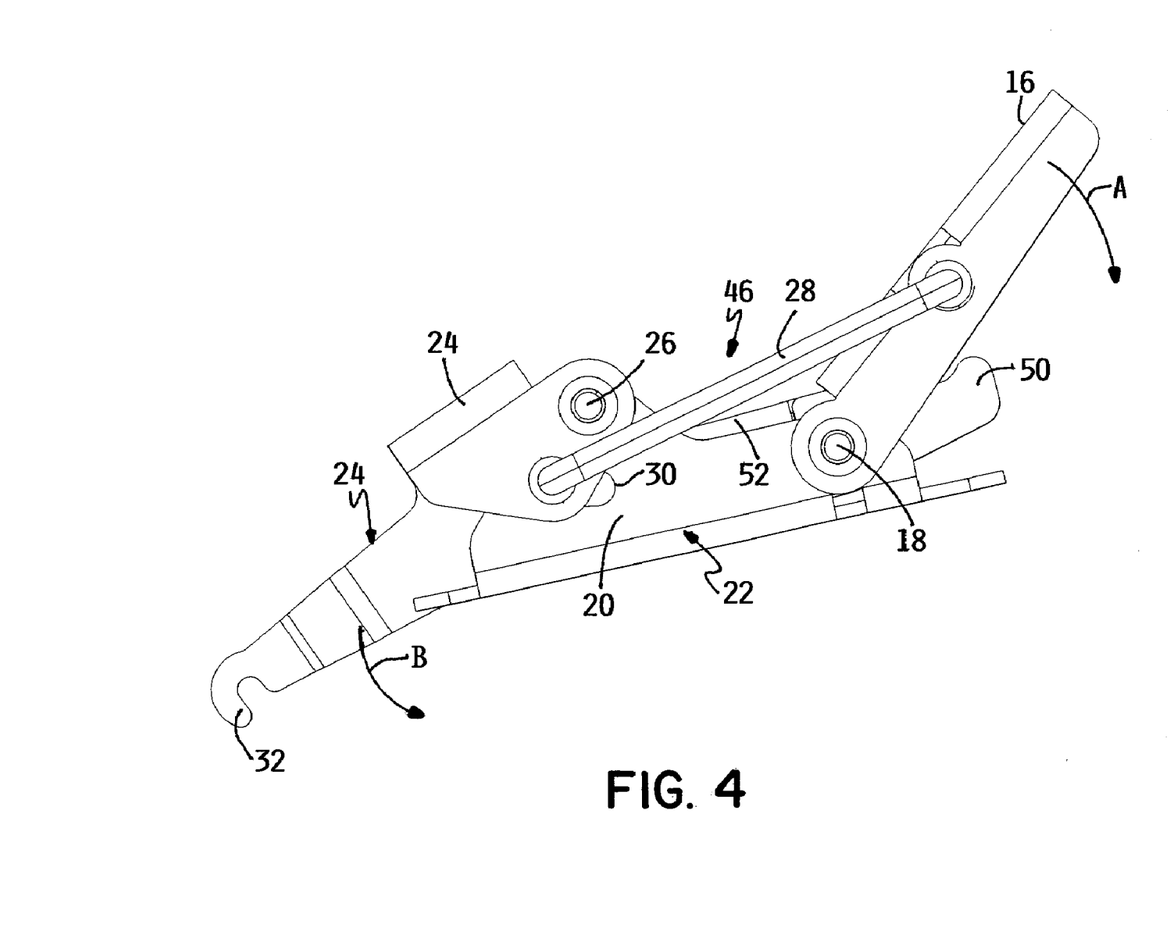
FIG. 4 is a side elevational view of the foot pedal control only, showing the foot pedal control in a non-depressed position at the start of its range of travel which position corresponds to a gate position in which the gate blocks the discharge opening.

Referring now to FIGS. 2-4, one embodiment of this invention also includes a pivotal foot pedal 16 carried on a floorboard 17 of the mower. Floorboard 17 is part of an operator's station on the frame of the mower adjacent the seat on which the operator is carried. As shall be explained in more detail hereafter, pedal 16 is operatively connected to gate 12. The operator can depress pedal 16 with his or her foot to control the position of gate 12 relative to discharge opening 10.

Pedal 16 is pivotally journalled by a pedal pivot pin 18 to the side walls 20 of a mounting bracket 22. Mounting bracket 22 is itself bolted or secured to floor-board 17 of the mower. In addition, a link 24 is also pivotally journalled to side walls 20 of mounting bracket 22 by a link pivot pin 26. A connecting rod 28 has its ends pivotally connected to both pedal 16 and link 24. Thus, as pedal 16 is depressed about pedal pivot pin 18 as shown by the arrow A in FIG. 4, connecting rod 28 pivots link 24 about link pivot pin 26 as shown by the arrow B in FIG. 4.

The end of connecting rod 28 that is pivotally connected to link 24 is turned inwardly towards the inner side wall 20 of mounting bracket 22. This inturned end of connecting rod 28 is received in a guide slot 30 in the inner side wall 20 for sliding back and forth therein as link 24 pivots back and forth on link pivot pin 26. The bottom end of guide slot 30 will engage the inturned end of connecting rod 38 to limit the pivoting motion of link 24 in one direction and to set the position of pedal 16 in the raised, non-depressed starting position thereof. Guide slot 30 is long enough to allow pedal 16 to move over its full range of travel without having the inturned end of connecting rod 38 contact or stop out against the upper end of guide slot 30.

As shown in FIG. 3, link 24 has a hook 32 at its lower end that is connected to a portion of a flexible cable linkage known as a Bowden cable 34. Bowden cable 34 has an outer sheath 36 that is clamped to a bracket 38 that is fixed to a part of the frame of the mower. Bowden cable 34 has an inner cable 40 that slides within outer sheath 36. Inner cable 40 has an eyelet 42 that is received around hook 32 on link 24. When link 24 pivots in the direction of the arrow B in FIG. 4, hook 32 on link 24 pulls on inner cable 40 in the direction of the arrow C in FIG. 3. This pull on inner cable 40 will change the position of gate 12 in a manner that will be explained hereafter.

A spring 44 located adjacent gate 12 exerts a biasing force on inner cable 40 of Bowden cable 34 as shown by the arrow D in FIG. 3. This spring force tends to keep pedal 16 in a raised, non-depressed, starting position as shown in FIG. 2-4. In this non-depressed position of pedal 16, gate 12 is arranged to be held by spring 44 in a closed, substantially vertical position in which gate 12 blocks off discharge opening 10. Any grass clippings created in cutting deck 2 at this time are contained within cutting deck 2 in a non-discharge mode of operation.

The operator can depress pedal 16 with his or her foot by pushing down on pedal 16 against the force of spring 44. This will pull on inner cable 40 in the direction of arrow C in FIG. 3 to begin to pivot gate 12 upwardly. As gate 12 pivots upwardly, it progressively opens discharge opening 10 to convert cutting deck 2 to a discharge mode of operation in which the grass clippings are discharged through discharge opening 10 beneath discharge chute 14.

Pedal 16 has a first range of travel in which the operator has to keep down pressure on pedal 16 to over-come the force of spring 44. During this first range of travel, the operator can use pedal 16 to feather the position of gate 12, i.e. the operator can open gate 12 a little more by pushing further down on pedal 16 or can open gate 12 a little less by letting up somewhat on pedal 16. In this feathering operation, gate 12 is an intermediate position in which it is partly open and partly closed, thus allowing the relative degrees of discharge and non-discharge to be adjusted by the operator on the fly while mowing.

Figure 5:
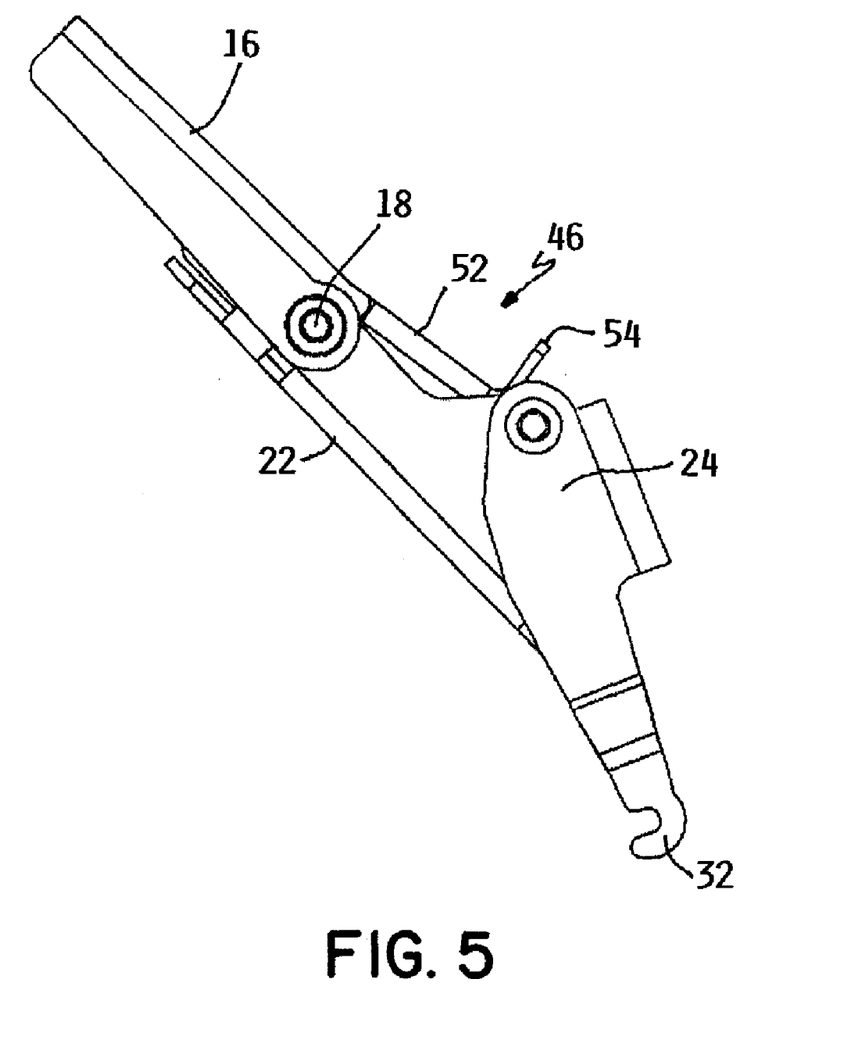
FIG. 5 is a side elevational view of the foot pedal control only, showing the foot pedal control in a fully depressed position at the end of its range of travel which position corresponds to a gate position in which the gate clears the discharge opening.

At some point, if the operator continues to increase the down pressure on pedal 16, pedal 16 is designed to be fully depressed against the base of the bracket as shown in FIG. 5. In this position, the pivotal connection between the front end of connecting rod 28 and pedal 16 has moved over center relative to pedal pivot pin 18. Pedal 16 is now locked in the fully depressed position thereof. In the fully depressed position of pedal 16, gate 12 is in its fully open position in which gate 12 is substantially horizontal and substantially fully clears discharge opening 10. Thus, the mower is now disposed in its discharge mode of operation without the operator having to keep constant down pressure on pedal 16.

There must be some way for the operator to release pedal 16 from its over center locked position described above. Accordingly, a rocker shaped, pivotal pedal release 46 also pivots on pedal pivot pin 18 in addition to pedal 16 itself. A front portion of release 46 underlies pedal 16 and has two release fingers 50 that extend vertically upwardly towards the underside of pedal 16. When pedal 16 is in its fully depressed position, fingers 50 will just slightly contact or be slightly below the underside of pedal 16. The rear arm 52 of release 46 is spaced behind pedal 16 and has a serrated upper edge 54 that is located in an open space between pedal 16 and link 24. Serrated upper edge 54 of rear arm 52 of release 46 provides a surface against which the user's shoe or boot can grip.

To release pedal 16 from its fully depressed, locked position, the operator need only place the heel or toes of his or her foot onto upper edge 54 of rear arm 52 of release 46 and push down on release 46. This pivots or rocks release 46 about pedal pivot pin 18 in the manner of a see-saw. Fingers 50 on front portion of release 46 will push up on pedal 16 to cause pedal 16 to rise until connecting rod 28 passes back over center in relation to pedal pivot pin 18. When this happens, the force of spring 44 acting on pedal 16 will cause pedal 16 to return to its non-depressed, starting position shown in FIGS. 2-4. Thus, release 46 simply lifts pedal 16 enough to break the over center orientation holding pedal 16 in the fully depressed position.

Figure 6:
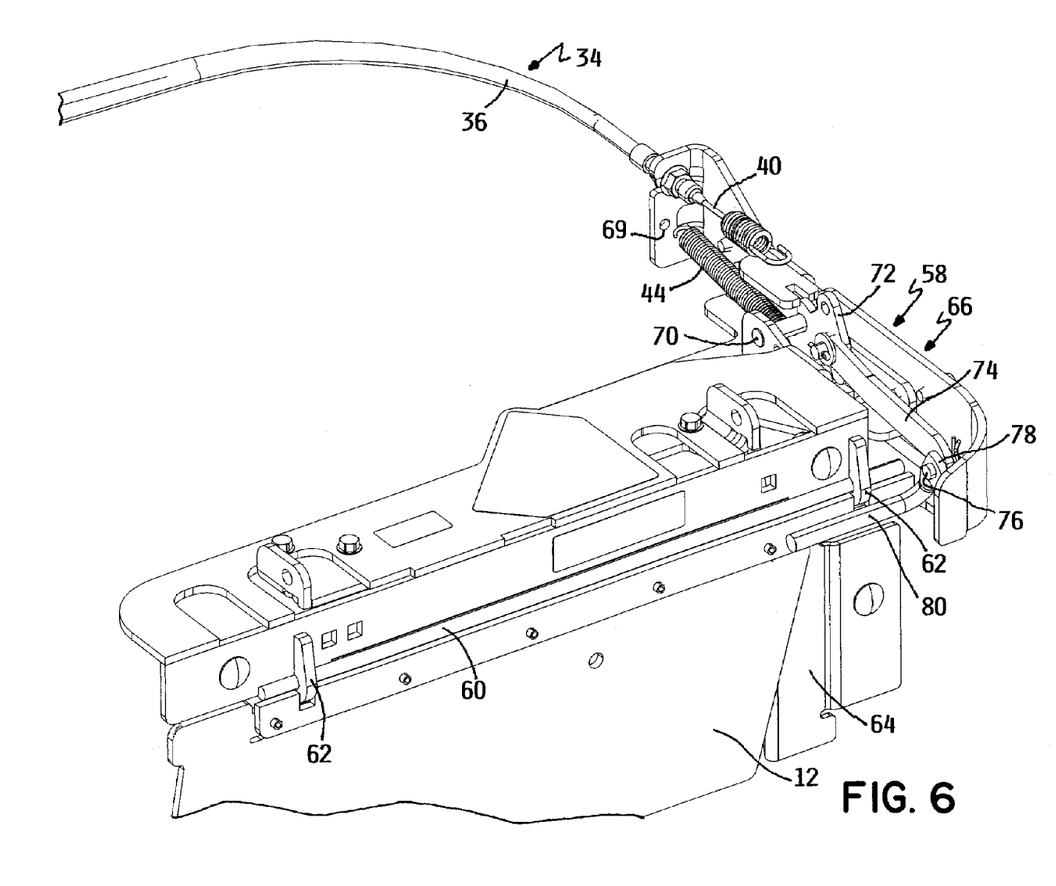
FIG. 6 is a perspective view of a portion of the cutting deck of FIG. 1, particularly illustrating the pivotal gate in its closed position overlying the discharge opening.
Figure 7:
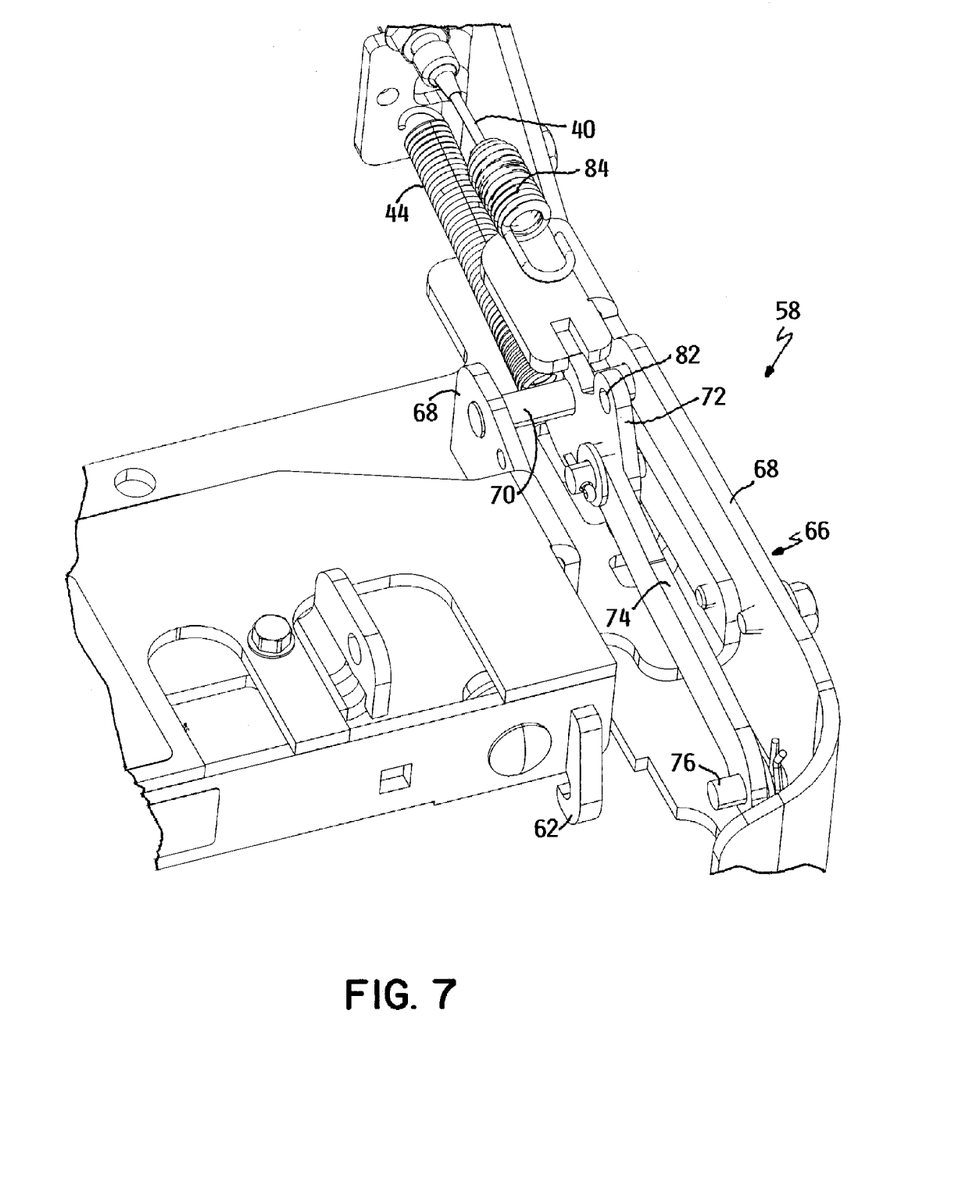
FIG. 7 is an enlarged perspective view of the top of the gate pivot linkage for pivoting the pivotal gate shown in FIG. 6.
Figure 8:
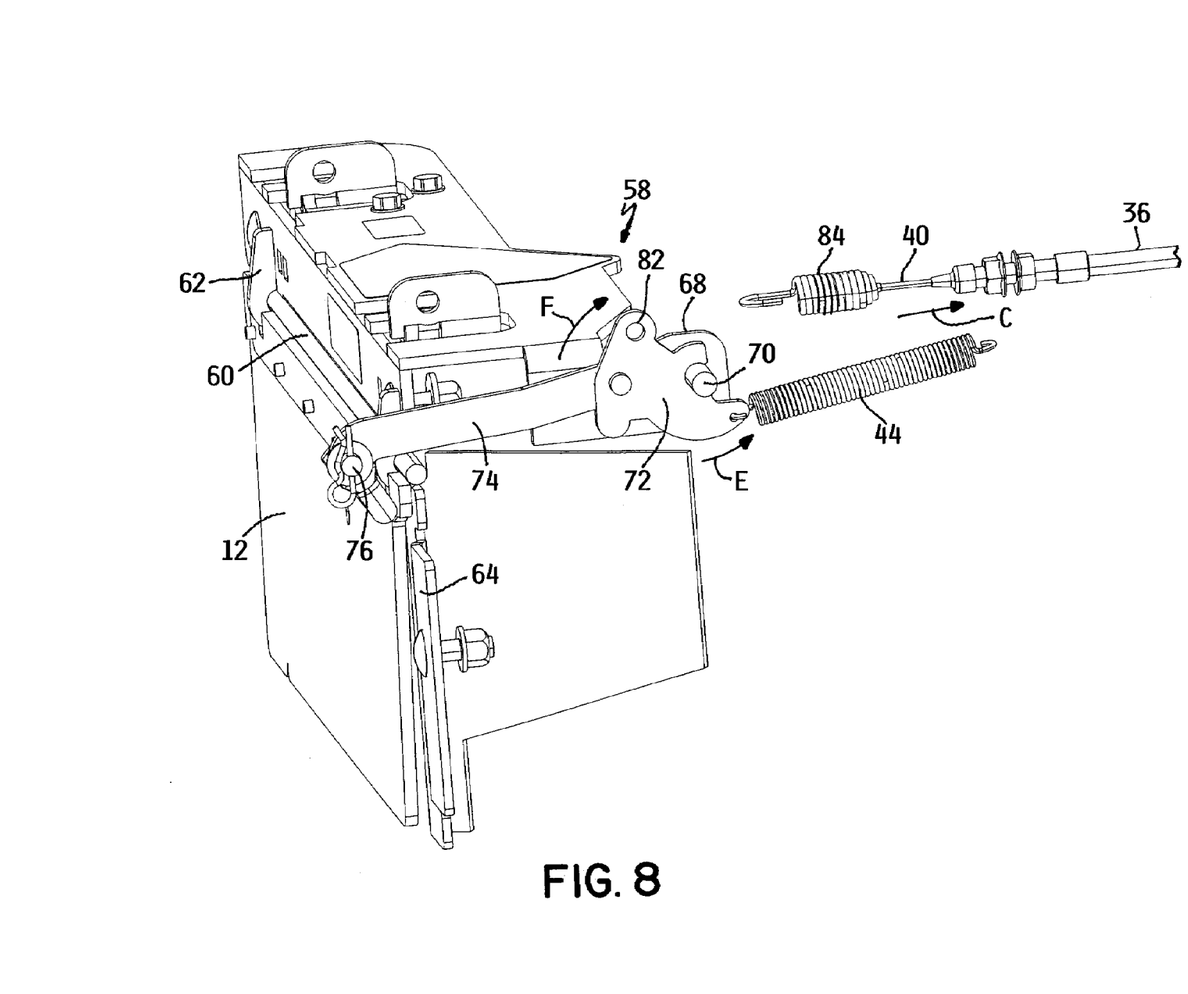
FIG. 8 is an enlarged perspective view of the side of the gate pivot linkage for pivoting the pivotal gate shown in FIG. 6.

Turning now to the remaining FIGS. 6-8, these figures show the pivotal mounting of gate 12 to the mower along with the gate pivot linkage 58 connected to gate 12. As seen in FIGS. 6 and 8, gate 12 simply comprises a planar flap or plate that is preferably shaped to be substantially as large as discharge opening 10. Gate 12 includes an upper, horizontal, gate pivot rod 60 secured to the upper edge thereof. Gate pivot rod 60 is captured in a pair of pivot brackets 62 carried on the mower frame adjacent the top edge of discharge opening 10. Thus, gate 12 can pivot about the axis of gate pivot rod 60 from a closed, vertical position as shown in FIG. 6 to an open, substantially horizontal position.

Discharge opening 10 can obviously have varying widths. In certain mowers, the width of discharge opening 10 can be made narrower by installing a width limiting bracket 64. When bracket 64 is in place as shown in FIGS. 6-8, the width of gate 12 conforms to the reduced width of the opening. Bracket 64 is used in some instances when gate 12 must be somewhat narrower so that it can freely pivot within discharge chute 14 without binding against or hitting chute 14. If width limiting bracket 64 is not needed and is removed, then gate 12 will have a larger width to conform to the increased width of discharge opening 10. Regardless of the precise dimensions of discharge opening 10, gate 12 is preferably approximately the same height and width as discharge opening 10 in cutting deck 2.

Referring now to FIGS. 7 and 8, gate pivot linkage 58 will now be described. Gate pivot linkage includes a bracket 66 carried on the mower frame adjacent one side of gate 12. Bracket 66 has a pair of side walls 68. A horizontal pivot pin 70 extends between bracket side walls 68. A gate pivot link 72 is rotatably journalled on pivot pin 70 for pivoting about the axis of pivot pin 70.

A connecting arm 74 has its rear end pivotally journalled on gate pivot link 72. The front end of connecting arm 74 extends forwardly to lie adjacent one side of gate 12. Gate 12 has a pivot pin 76 carried on an upwardly extending ear 78 of a rod 80 that is fixed to gate 12. The front end of connecting arm 74 is pivotally journalled on pivot pin 76 of gate 12. This connection is ahead of the pivot axis of gate pivot rod 60 as shown in FIG. 8. When connecting arm 74 is pivoted upwardly and downwardly, ear 78 of rod 80 is raised or lowered to pivot gate 12 in one direction or the other about axis of gate pivot rod 60.

The biasing spring 44 (that pulls on inner cable 40 of Bowden cable 34) has a front end connected to the bottom of gate pivot link 72 beneath pivot pin 70 and a rear end that will be connected to an opening 69 on the extended bracket that is part of gate pivot linkage 58. See FIG. 6. Spring 44 tends to rotate gate pivot link 72 in the direction of the arrow E in FIG. 8. The top of gate pivot link 72 has an eye 82 to which the front end of inner cable 40 of Bowden cable 34 is attached. Thus, when gate pivot link 72 rotates in the direction of the arrow E, inner cable 40 of Bowden cable 34 is being pulled in the direction of the arrow D in FIG. 4. Thus, spring 44 that is provided as part of gate pivot linkage 58 is the source of the spring force on pedal 16 as well.

The front end of inner cable 40 of Bowden cable 34 is also provided with a small spring 84 to accommodate tolerance differences in Bowden cable 34 and to provide some over-travel. Spring 84 does not substantially bias pedal 16. The biasing force on pedal 16 is provided primarily by spring 44 extending between the frame of the mower and gate pivot link 72.

When gate pivot link 72 is disposed as shown in FIGS. 6-8, where gate pivot link 72 has not been rotated by inner cable 40, connecting arm 74 will have its front end lowered and gate 12 will be in its closed position. In this orientation, the connection between connecting arm 74 and gate pivot link 72 is an over center position relative to gate pivot pin 70. In this over center position, the force of spring 44 will tend to hold gate 12 in its closed position. If the operator depresses pedal 16 so that inner cable 40 is now pulled in the direction C in FIGS. 4 and 8, then gate pivot link 72 will be pivoted in the direction F in FIG. 8 to raise connecting arm 74 and thereby pivot gate 12 to its open position. The connection between connecting arm 74 and gate pivot link 72 will rise above pivot pin 70 for gate pivot link 72 when gate 12 reaches its open position with pedal 16 fully depressed. In this position, the gate 12 will then be locked in its open position by the over center orientation of pedal 16 as described earlier.

Accordingly, when pedal 16 is fully depressed, gate 12 is held or locked in its open position by a first over center arrangement, namely the over center orientation between the connection point of connecting rod 28 and pedal 16 relative to pedal pivot pin 18. When pedal 16 is in its non-depressed starting position and gate 12 is closed, gate 12 is held or locked in its closed position by the second over center arrangement comprising the over center orientation between the connection point of connecting arm 74 and gate pivot link 72 relative to gate pivot pin 70.

Locking gate 12 in its closed position is desirable since the force of the grass clippings acting against gate 12 would otherwise tend to raise or open gate 12. Using the over center arrangement in gate pivot link 72 to help lock gate 12 in its closed position helps minimize the size of spring 44. Spring 44 does not itself have to provide the entire force for retaining gate 12 closed. Because a smaller spring 44 is used, the spring pressure acting on pedal 16 is also smaller requiring less downforce from the operator to depress pedal 16.

Gate 12 of the preferred embodiment of this invention has advantages over similar gates in the prior art. First, gate 12 can be operated by an operator without having to remove the operator's hands from the steering controls of the mower. This can be done simply by depressing foot pedal 16. This is an advantage particularly when the operator is attempting to switch modes of operation while maneuvering or steering around complicated boundaries or edges in the lawn.

In addition, the operator can easily feather the position of gate 12 to intermediate positions between fully open and fully closed simply by partially but not fully depressing pedal 16. In these intermediate positions, neither of the over center arrangements used to hold gate 12 in the open and closed positions thereof have become effective. The operator senses through his foot only the pressure of spring 44 acting against pedal 16.

However, if the operator wishes, he can fully depress pedal 16 to lock gate 12 in its open position to place the mower into its discharge mode of operation. When this occurs, the over center arrangement described in connection with pedal 16 has become effective and gate 12 will be held in the open position. However, the operator can release this locked orientation of gate 12 at any time using release 46. He or she need only depress the rear edge of release 46 to lift pedal 16 until the pedal locking over center orientation is broken. Then, gate 12 will return to and be locked in its closed position when the over center orientation of gate pivot link 72 is reestablished. This over center orientation is broken the next time the operator depresses pedal 16 to raise gate 12.

Various modifications of this invention will be apparent to those skilled in the art. While the invention is well suited for use on mowers in which an operator is carried on the mower at an operator's station designed to support the operator in a seated or standing position, the invention could be adapted for use on walk-behind mowers. Thus, the scope of this invention will be limited only by the appended claims.

We claim:

1. A mower cutting deck having a discharge opening for discharging grass clippings from the cutting deck, which comprises:
   (a) a movable gate having a closed position in which the gate substantially blocks the discharge opening to prevent the passage of the grass clippings through the discharge opening to place the cutting deck in a non-discharge mode of operation and an open position in which the gate substantially clears the discharge opening to permit the passage of the grass clippings through the discharge opening to place the cutting deck in a discharge mode of operation;
   (b) a pivotal foot pedal operatively coupled to the gate for allowing an operator to control the position of the gate by depressing the foot pedal, wherein the pivotal foot pedal controls the position of the gate independently of and without affecting the cutting deck's ground speed during a mowing operation, wherein the foot pedal can be selectively depressed by the operator between a non-depressed starting position and a fully depressed ending position, wherein the non-depressed starting position of the foot pedal corresponds to the closed position of the gate and the fully depressed ending position corresponds to the open position of the gate, wherein the foot pedal has an over center linkage, the over center linkage moving into an over center orientation when the foot pedal reaches the fully depressed, ending position thereof to lock the foot pedal in the fully depressed, ending position without requiring additional down pressure from the operator on the foot pedal;
   (c) a spring that applies a spring force to the foot pedal tending to cause the foot pedal to rise to its non-depressed starting position such that the operator has to apply down pressure to the foot pedal to move the foot pedal against the spring force, whereby the spring force opposes movement of the foot pedal at least over a first range of travel of the foot pedal such that the operator can feather the position of the foot pedal by increasing or decreasing the down pressure on the foot pedal to hold the gate in intermediate positions between the open and closed positions of the gate; and
   (d) a pedal release for allowing the operator to selectively break the over center orientation of the over center linkage to release the foot pedal from its fully depressed, ending position.

2. The mower cutting deck of claim 1, wherein the pedal release is foot operated.

3. The mower cutting deck of claim 2, wherein the pedal release is pivotal and has a first portion underlying the foot pedal and a second portion that is accessible to the foot of the operator, wherein the operator can step on the second portion of the release to lift the first portion of the release to push upwardly on the foot pedal to thereby break the over center orientation of the over center linkage.

4. A mower cutting deck having a discharge opening for discharging grass clippings from the cutting deck, which comprises:
   (a) a movable gate having a closed position in which the gate substantially blocks the discharge opening to prevent the passage of the grass clippings through the discharge opening to place the cutting deck in a non-discharge mode of operation and an open position in which the gate substantially clears the discharge opening to permit the passage of the grass clippings through the discharge opening to place the cutting deck in a discharge mode of operation, wherein the gate pivots adjacent the discharge opening for pivoting between the open and closed positions of the gate;

(b) a pivotal foot pedal operatively coupled to the gate for allowing an operator to control the position of the gate by depressing the foot pedal, wherein the pivotal foot pedal controls the position of the gate indepndently of and without affecting the cutting deck's ground speed during a mowing operation, wherein the foot pedal can be selectively depressed by the operator between a non-depressed starting position and a fully depressed ending position, wherein the non-depressed starting position of the foot pedal corresponds to the closed position of the gate and the fully depressed ending position corresponds to the open position of the gate;

(c) a spring that applies a spring force to the foot pedal tending to cause the foot pedal to rise to its non-depressed starting position such that the operator has to apply down pressure to the foot pedal to move the foot pedal against the spring force, whereby the spring force opposes movement of the foot pedal at least over a first range of travel of the foot pedal such that the operator can feather the position of the foot pedal by increasing or decreasing the down pressure on the foot pedal to hold the gate in intermediate positions between the open and closed positions of the gate;

(d) a flexible cable operatively linking the foot pedal and the gate; and (e) a gate pivot linkage between one end of the flexible cable and the gate, wherein the gate pivot linkage includes an over center linkage that moves to an over center orientation when the gate is disposed in the closed position thereof to lock the gate in the closed position thereof.

5. The mower cutting deck of claim 4, wherein the spring is part of the gate pivot linkage.

6. The mower cutting deck of claim 5, wherein the spring holds the over center linkage in the gate pivot linkage in the over center orientation thereof after the over center orientation is reached.

7. A mower cutting deck having a discharge opening for discharging grass clippings from the cutting deck, which comprises:

(a) a pivotal gate adjacent the discharge opening, wherein the gate has an open position to substantially permit the passage of the grass clippings through the discharge opening and a closed position to substantially prevent the passage of the grass clippings through the discharge opening for opening and closing the discharge opening, respectively;

(b) a pivotal control that may be selectively raised and lowered by an operator;

(c) a gate pivot linkage linking the pivotal control and the gate for raising and lowering the gate in response to the raising and lowering of the pivotal control, wherein the raising and lowering of the pivotal control are inversely related to the raising and lowering of the gate such that raising the pivotal control lowers the gate to move the gate from the open position to the closed position thereof and lowering the pivotal control raises the gate to move the gate from the closed position to the open position thereof;

(d) a first over center linkage which moves into an over center orientation when the pivotal control is lowered and the gate reaches the open position thereof to retain the gate in the open position such the operator can thereafter release the pivotal control and the gate will remain in the open position; and (e) a second over center linkage in the gate pivot linkage, wherein the second over center linkage holds the gate in the closed position thereof.

8. The mower cutting deck of claim 7, wherein the first over center linkage is in the pivotal control.

9. The mower cutting deck of claim 8, wherein the pivotal control comprises a foot pedal.

10. The mower cutting deck of claim 9, wherein a flexible cable connects the foot pedal to the gate pivot linkage.

11. The mower cutting deck of claim 10, further including a biasing spring acting on the gate pivot linkage to bias the cable in a first direction in which the foot pedal is biased towards a raised, starting position thereof.

12. The mower cutting deck of claim 11, wherein the first over center linkage does not reach its over center orientation until the foot pedal has been depressed through a first range of travel and substantially arrives at a fully depressed, ending position.

13. A mower cutting deck having a discharge opening for discharging grass clippings from the cutting deck, which comprises:

(a) a movable gate having a closed position in which the gate substantially blocks the discharge opening to place the cutting deck in a non-discharge mode of operation and an open position in which the gate substantially clears the discharge opening to place the cutting deck in a discharge mode of operation;

(b) a pivotal foot pedal operatively coupled to the gate for allowing an operator to control the position of the gate by depressing the foot pedal, wherein the foot pedal can be selectively depressed by the operator between a non-depressed starting position and a fully depressed ending position;

(c) an over center linkage moving into an over center orientation when the foot pedal reaches the fully depressed, ending position thereof to lock the foot pedal in the fully depressed, ending position without requiring additional down pressure from the operator on the foot pedal; and (d) a foot operated, pivotal pedal release, wherein the pedal release is pivotal and has a first portion undepying the foot pedal and a second portion that is accessible to the foot of the operator, wherein the operator can step on and depress the second portion of the release to lift the first portion of the release to push upwardly on the foot pedal to thereby break the over center orientation of the over center linkage.

* * * * *